US010482332B2

(12) United States Patent
Baba

(10) Patent No.: US 10,482,332 B2
(45) Date of Patent: Nov. 19, 2019

(54) PEDESTRIAN DETERMINING APPARATUS FOR DETERMINING WHETHER AN OBJECT IS A PEDESTRIAN CROSSING AHEAD OF AN OWN VEHICLE

(71) Applicant: DENSO CORPORATION, Kariya, Aichi pref. (JP)

(72) Inventor: Takahiro Baba, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 43 days.

(21) Appl. No.: 15/562,398

(22) PCT Filed: Apr. 1, 2016

(86) PCT No.: PCT/JP2016/060955
§ 371 (c)(1),
(2) Date: Sep. 27, 2017

(87) PCT Pub. No.: WO2016/159364
PCT Pub. Date: Oct. 6, 2016

(65) Prior Publication Data
US 2018/0114074 A1  Apr. 26, 2018

(30) Foreign Application Priority Data

Apr. 2, 2015 (JP) .................. 2015-075826

(51) Int. Cl.
G06K 9/00 (2006.01)
G06K 9/62 (2006.01)
(Continued)

(52) U.S. Cl.
CPC ............ G06K 9/00805 (2013.01); B60T 7/22 (2013.01); B60T 8/17 (2013.01); G01S 7/412 (2013.01);
(Continued)

(58) Field of Classification Search
None
See application file for complete search history.

(56) References Cited

U.S. PATENT DOCUMENTS

2012/0140073 A1*  6/2012  Ohta ........................ B60R 1/00
                                                    348/148
2014/0297171 A1    10/2014  Minemura et al.
2016/0185325 A1*  6/2016  Ike ............................ B60T 7/22
                                                    701/70

FOREIGN PATENT DOCUMENTS

JP       2009217680 A      9/2009
JP       2009237773 A      10/2009
(Continued)

Primary Examiner — Idowu O Osifade
(74) Attorney, Agent, or Firm — Knobbe, Martens, Olson & Bear, LLP

(57) ABSTRACT

In a pedestrian determining apparatus, an object detecting unit detects, based on waves reflected by an object, the object as a radar-based object. The reflected waves are generated based on reflection, by the object, of radar waves transmitted ahead of the own vehicle. A likelihood calculating unit calculates, for the radar-based object, a likelihood of the radar-based object being a pedestrian crossing ahead of the own vehicle. A pedestrian determining unit determines whether the likelihood is equal to or higher than a predetermined threshold, and determines that the radar-based object is a pedestrian crossing ahead of the own vehicle if the likelihood is equal to or higher than the predetermined threshold. The likelihood calculating unit sets the likelihood for the radar-based object to be lower if the radar-based object is detected as a part of an object group arranged at regular intervals than otherwise.

13 Claims, 5 Drawing Sheets

(51) Int. Cl.
*G06K 9/78* (2006.01)
*B60T 7/22* (2006.01)
*G01S 13/93* (2006.01)
*G08G 1/16* (2006.01)
*B60T 8/17* (2006.01)
*G01S 7/41* (2006.01)
*G01S 13/86* (2006.01)
*B60R 21/00* (2006.01)

(52) U.S. Cl.
CPC .......... *G01S 13/867* (2013.01); *G01S 13/931* (2013.01); *G06K 9/00335* (2013.01); *G06K 9/00362* (2013.01); *G06K 9/6202* (2013.01); *G06K 9/78* (2013.01); *G08G 1/166* (2013.01); *B60R 21/00* (2013.01); *B60T 2201/022* (2013.01); *B60T 2210/32* (2013.01); *B60Y 2400/3015* (2013.01); *B60Y 2400/3017* (2013.01); *G01S 2013/9346* (2013.01)

(56) References Cited

FOREIGN PATENT DOCUMENTS

| | | | |
|---|---|---|---|
| JP | 2010244194 | A | 10/2010 |
| JP | 2012203884 | A | 10/2012 |
| JP | 2012229947 | A | 11/2012 |
| JP | 2014197325 | A | 10/2014 |

* cited by examiner

PEDESTRIAN DETERMINING APPARATUS FOR DETERMINING WHETHER AN OBJECT IS A PEDESTRIAN CROSSING AHEAD OF AN OWN VEHICLE

TECHNICAL FIELD

The present invention relates to pedestrian determining apparatuses.

BACKGROUND ART

Conventional pre-crash safety (PCS) systems detect an object located in front of an own vehicle, and performs a task of avoiding a collision between the object and the own vehicle upon determining that there is a high probability of a collision between the object and the own vehicle. As the task of avoiding a collision, a warning outputting task and/or an automatic braking task can be used.

It is assumed that, in a place, such as an urban area, where many pedestrians are located in front of an own vehicle, the PCS system of the own vehicle is activated for each of the pedestrians when the pedestrian is detected as an object located in front of the own vehicle. In this assumption, the PCS system is activated for a pedestrian detected even if the pedestrian is slightly moving ahead of the own vehicle with no intention to cross ahead of the own vehicle, thus performing the task of avoiding a collision between the own vehicle and the pedestrian, such as a warning outputting task.

For this reason, what is needed is to determine whether a pedestrian located in front of the own vehicle is crossing ahead of the own vehicle with higher accuracy, and change the activation condition of the PCS system in accordance with the determination result.

The technology disclosed in patent document 1 is configured to determine whether a pedestrian as an object is crossing ahead of an own vehicle in accordance with the history of movement of the pedestrian.

CITATION LIST

Patent Literature

Japanese Patent Application. Publication No. 2014-197325

SUMMARY

Technical Problem

It may be unfortunately difficult to determine whether a pedestrian is crossing ahead of the own vehicle with high accuracy depending on an environment around the own vehicle.

In view of these circumstances, one aspect of the present invention seeks to provide pedestrian determining apparatuses, each of which is capable of determining whether a pedestrian is crossing ahead of an own vehicle with higher accuracy.

Solution to Problem

A pedestrian determining apparatus according to a first exemplary aspect of the present invention is a pedestrian determining apparatus for determining whether an object is a pedestrian crossing ahead of an own vehicle. The pedestrian determining apparatus includes an object detecting unit that detects, based on waves reflected by an object, the object as a radar-based object. The reflected waves are generated based on reflection, by the object, of radar waves sent ahead of the own vehicle. The apparatus includes a likelihood calculating unit that calculates, for the radar-based object detected by the object detecting unit, a likelihood of the radar-based object being a pedestrian crossing ahead of the own vehicle. The apparatus includes a pedestrian determining unit that determines whether the calculated likelihood is equal to or higher than a predetermined threshold. The pedestrian determining unit determines that the radar-based object is a pedestrian crossing ahead of the own vehicle upon determination that the calculated likelihood is equal to or higher than the predetermined threshold. The likelihood calculating unit is configured to set the likelihood for the radar-based object to be lower if the radar-based object is detected as a part of a group of objects arranged at regular intervals than if the radar-based object is not detected as a part of the group of objects arranged at regular intervals.

The pedestrian determining apparatus according to the first exemplary aspect of the present invention is configured to set the likelihood for the radar-based object to be lower if the radar-based object is detected as a part of a group of objects arranged at regular intervals than if the radar-based object is not detected as a part of the group of objects arranged at regular intervals. This likelihood control reduces the probability of an object in an object group, such as a pole group, which are arranged on a travelling road of the own vehicle at regular intervals, being determined as a pedestrian crossing ahead of the own vehicle. This enables the pedestrian determining apparatus according to the first exemplary aspect of the present invention to determine whether a pedestrian is crossing ahead of the own vehicle with higher accuracy.

A pedestrian determining apparatus according to a second exemplary aspect of the present invention is a pedestrian determining apparatus for determining whether an object is a pedestrian crossing ahead of an own vehicle. The pedestrian determining apparatus includes an object detecting unit that detects, based on waves reflected by an object, the object as a radar-based object. The reflected waves are generated based on reflection, by the object, of radar waves transmitted ahead of the own vehicle. The apparatus includes an image obtaining unit that obtains a captured image of scenery ahead of the own vehicle, and an image recognizing unit that recognizes an object in the obtained image as an image-based object. The apparatus includes a matching level obtaining unit includes a dictionary of pedestrians, and is configured to obtain, upon the image-based object recognized by the image recognizing unit being identical to the radar-based object detected by the object detecting unit, a matching level between the image-based object and the dictionary of pedestrians in accordance with a matching task between the image-based object and the dictionary of pedestrians The apparatus includes an optical flow obtaining unit configured to, upon the image-based object recognized by the image recognizing unit being identical to the radar-based object detected by the object detecting unit, obtain optical flows of feature points on the image-based object. The apparatus includes a moving speed obtaining unit that obtains a lateral moving speed of the radar-based object, and a movement distance obtaining unit that obtains a lateral movement distance of the radar-based object. The apparatus includes a likelihood calculating unit.

The likelihood calculating unit is configured to execute at least one of

1. A first task to set a first likelihood for the radar-based object to be lower if the radar-based object is detected as a part of a group of objects arranged at regular intervals than if the radar-based object is not detected as a part of the group of objects arranged at regular intervals, the first likelihood being a likelihood of the radar-based object being a pedestrian crossing ahead of the own vehicle 2. A second task to set a second likelihood for the radar-based object such that, the higher the matching level is, the higher the second likelihood for the radar-based object is, the second likelihood being a likelihood of the radar-based object being a pedestrian crossing ahead of the own vehicle 3. A third task to set a third likelihood for the radar-based object to be higher if the optical flows show lateral movements on the image than if the optical flows do not show the lateral movements on the image, the third likelihood being a likelihood of the radar based object being a pedestrian crossing ahead of the own vehicle 4. A fourth task to set a fourth likelihood for the radar-based object to be higher if intensities of the reflected waves are equal to or less than a predetermined threshold level than if the intensities of the reflected waves are more than the predetermined threshold level, and set the fourth likelihood for the radar-based object to be higher if magnitudes of fluctuations of the reflected waves are equal to or more than a predetermined threshold value than if the magnitudes of the fluctuations of the reflected waves are less than the predetermined threshold value, the fourth likelihood being a likelihood of the radar-based object being a pedestrian crossing ahead of the own vehicle 5. A fifth task to set a fifth likelihood for the radar-based object to be higher if the lateral moving speed of the radar-based object is within a predetermined range than if the lateral moving speed of the radar-based object is outside the predetermined range, the fifth likelihood being a likelihood of the radar-based object being a pedestrian crossing ahead of the own vehicle 6. A sixth task to set a sixth likelihood for the radar-based object to be higher if the lateral movement distance of the radar-based object is within a predetermined distance range than if the lateral movement distance of the radar-based object is outside the predetermined distance range, the sixth likelihood being a likelihood of the radar-based object being a pedestrian crossing ahead of the own vehicle.

The pedestrian determining apparatus according to the second exemplary aspect of the present invention includes a pedestrian determining unit that determines whether the radar-based object is a pedestrian crossing ahead of the own vehicle in accordance with at least one of the first to sixth likelihoods obtained by a corresponding at least one of the first to sixth tasks.

The pedestrian determining apparatus according to the second exemplary aspect of the present invention is configured to execute at least one of the first to sixth tasks to thereby calculate a corresponding at least one of the first to sixth likelihoods. The pedestrian determining apparatus according to the second exemplary aspect of the present invention is therefore capable of determining whether the radar-based object is a pedestrian crossing ahead of the own vehicle in accordance with the calculated likelihood.

The pedestrian determining apparatus according to the second exemplary aspect of the present invention is capable of selecting, in the first to sixth tasks, one or more tasks suitable for the travelling conditions of the own vehicle, and capable of executing the selected one or more tasks, thus calculating one or more likelihoods suitable for the travelling conditions of the own vehicle.

This therefore enables the pedestrian determining apparatus according to the second exemplary aspect of the present invention to determine whether a pedestrian is crossing ahead of the own vehicle with higher accuracy.

DESCRIPTION OF THE EMBODIMENTS

The following describes an embodiment of the present invention with reference to the accompanying drawings.

1. Structure of Control ECU 1 and other Devices

Figure 1:
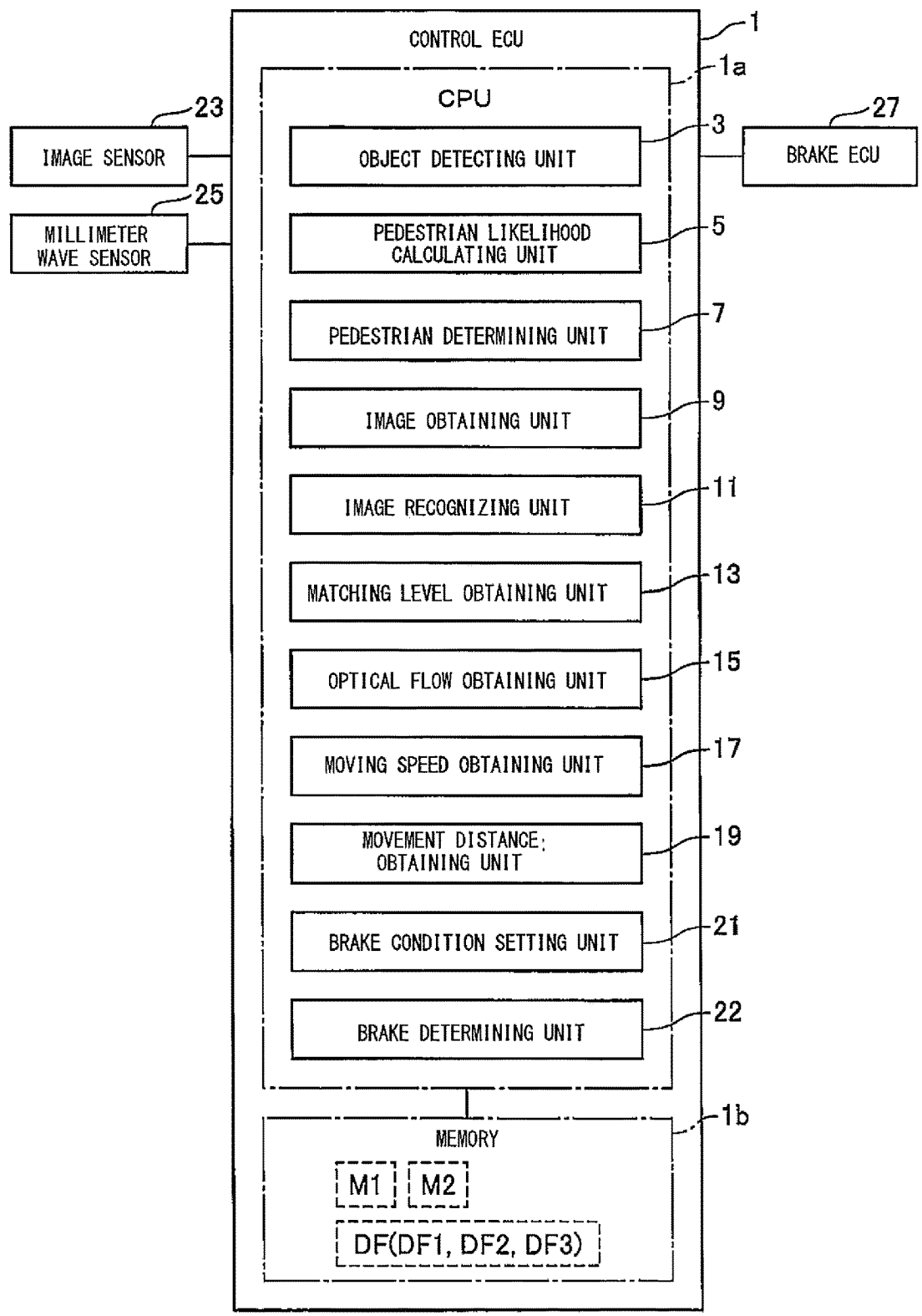
FIG. 1 is a block diagram illustrating a control ECU according to an embodiment of the present invention, and components associated with the control ECU

The following describes a control ECU 1 and a structure associated with the control ECU 1 with reference to FIG. 1. The control ECU 1 serves as an example of a pedestrian determining apparatus. The control ECU 1 is an in-vehicle apparatus installed in a vehicle 29. The vehicle 29 installing therein the control ECU 1 will be referred to as an own vehicle 29. The control ECU 1 includes a known computer that is comprised of a CPU 1*a*, a memory 1*b* including a ROM and/or a RAM, and necessary peripheral devices. The control ECU 1, i.e. its CPU 1*a*, runs programs installed in the ROM to implement tasks described later.

The CPU 1*a* of the control ECU 1 functionally includes an object detecting unit 3, a pedestrian likelihood calculating unit 5, a pedestrian determining unit 7, an image obtaining unit 9, an image recognizing unit 11, and a matching level obtaining unit 13. The CPU 1*a* also functionally includes an optical flow obtaining unit 15, a moving speed obtaining unit 17, a movement distance obtaining unit 19, a brake condition setting unit 21, and a brake determining unit 22. These functions will he described later.

The own vehicle 29 includes, in addition to the control ECU 1, an image sensor 23, a millimeter wave radar 25, and a brake ECU 27.

The image sensor 23 periodically captures an image of scenery ahead of the own vehicle 29, for example, scenery in front of the own vehicle 29 as a frame image, and generates image data corresponding to each captured frame image of corresponding front scenery.

The millimeter wave radar 25 transmits frequency-modulated radar waves within a millimeter waveband, and receives reflected waves, i.e. echoes, generated based on reflection of the transmitted radar waves. The millimeter radar detects, based on the received reflected waves, objects, such as other vehicles, pedestrians, roadside objects, and obstacles, in the travelling direction of the own vehicle 29.

In addition, the millimeter wave radar 25 is capable of obtaining, based on the received reflected waves, the distance, i.e. relative distance, between each object and the own vehicle 29, the azimuth of each object relative to the own vehicle 29, and the relative speed of each object relative to the own vehicle 29.

The brake ECU 27 includes a known computer that is comprised of a CPU, a memory including a ROM and/or a RAM, and necessary peripheral devices. The brake ECU runs programs installed in the ROM to implement various tasks. The brake ECU 27 performs a task of automatically braking the own vehicle 29 in response to receiving an execution instruction from the control ECU 1 as one task of the various tasks.

2. Pedestrian Determining Task Carried Out by Control ECU 1

The following describes a pedestrian determining task carried out by the control ECU 1 in a predetermined period with reference to FIGS. 2 to 5.

Figure 2:
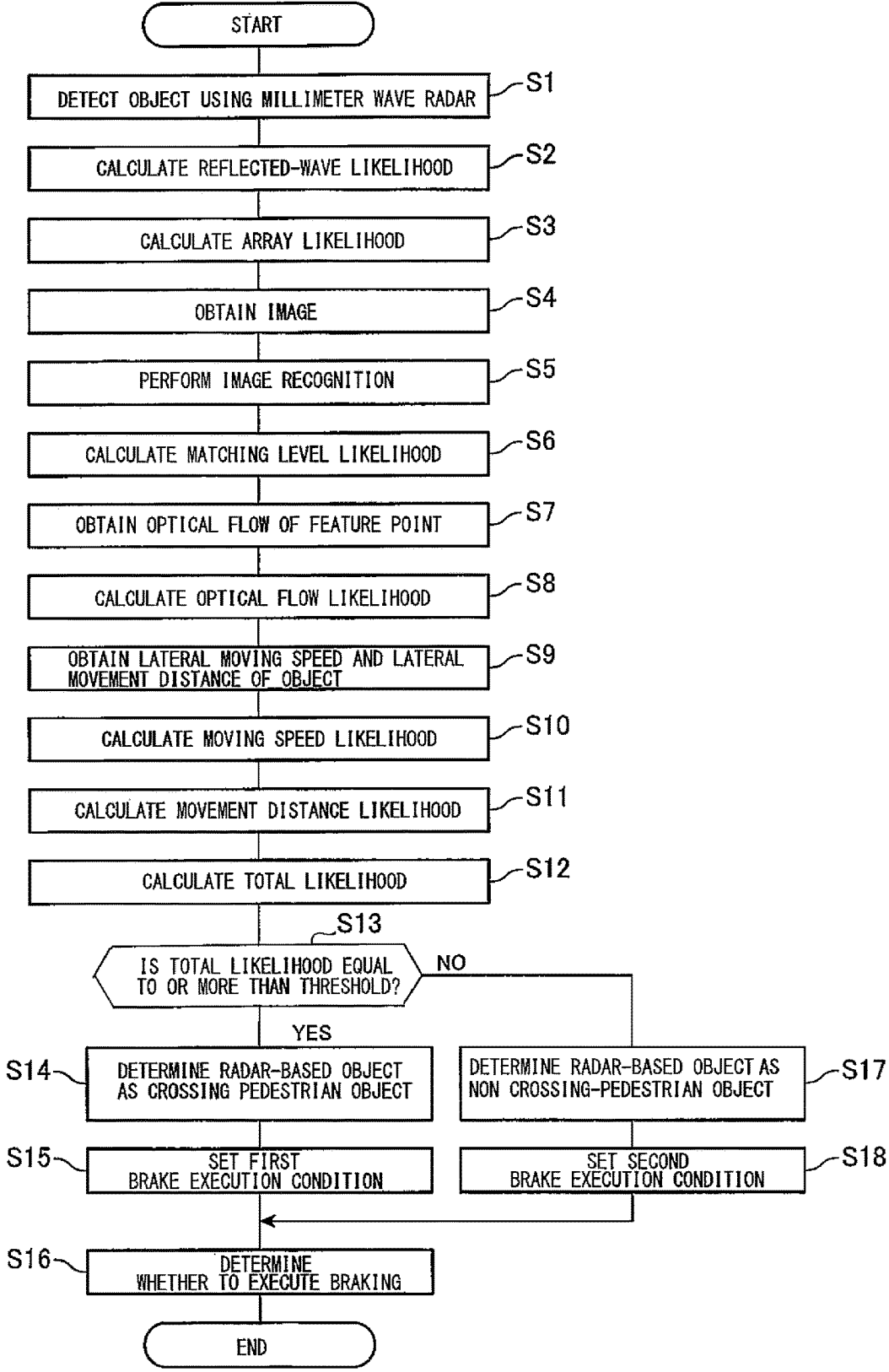
FIG. 2 is a flowchart illustrating a pedestrian determining task carried out by the control ECU illustrated in FIG. 1.

In step S1 of FIG. 2, the object detecting unit 3 of the control ECU 1 detects an object existing in the travelling direction using the millimeter wave radar 25. Then, the object detecting unit 3 of the control ECU 1 obtains the distance of the detected object relative to the own vehicle 29, the azimuth of the detected object, and the relative speed of the detected object relative to the own vehicle 29.

In step S2, the pedestrian likelihood calculating unit 5 calculates, based on waves reflected by an object detected by the millimeter wave radar 25 in step S1, a likelihood for the detected object in accordance with the following procedures; the object detected by the millimeter wave radar 25 in step S1 will be referred to as a radar-based object.

Note that the likelihood for a radar-based object represents, for example, a plausibility of the radar-based object being a crossing pedestrian as a numerical value.

The pedestrian likelihood calculating unit 5, i.e. the likelihood calculating unit 5, obtains the intensities and the magnitudes of the fluctuations of the reflected waves when the radar-based object is detected in step S1; the reflected waves are radio waves generated based on reflection of the radar waves by the radar-based object. The fluctuations of the reflected waves mean the degree of variations in the intensities of the reflected waves over time.

The memory 1b stores information defining the relationship between the intensities of the reflected waves, the magnitudes of the fluctuations of the reflected waves, and values of a reflected-wave likelihood described later; the information is in the form of, for example, a map, and is stored in the memory 1b as a map M1. Specifically, the likelihood calculating unit 5 inputs the intensities of the reflected waves and the magnitudes of the fluctuations of the reflected waves to the map M1 to thereby calculate corresponding values of the reflected-wave likelihood in the map M1.

A value of the reflected-wave likelihood calculated set forth above based on the intensities of reflected waves are set to be larger if the intensities of the reflected waves exceed a predetermined first threshold than if the intensities of the reflected waves do not exceed the predetermined first threshold. Similarly, a value of the reflected-wave likelihood calculated set forth above based on the intensities of reflected waves is set to be larger if the magnitude of the fluctuations of the reflected waves does not exceed a predetermined second threshold than if the magnitude of the fluctuations of the reflected waves exceeds the predetermined second threshold.

Note that the reflected-wave likelihood represents the probability of the radar-based object detected by the object detecting unit 3 being a pedestrian crossing ahead of the own vehicle 29. The reflected-wave likelihood is positive, and the larger the value of the reflected-wave likelihood is, the higher the likelihood for the radar-based object being a pedestrian crossing ahead of the own vehicle 29.

In step S3, the pedestrian likelihood calculating unit 5 calculates, for the radar-based object detected in step S1, a likelihood for a pedestrian associated with an array for the radar-based object; this likelihood will be referred to as an array likelihood.

Note that the array likelihood is a parameter representing a probability of the radar-based object being a pedestrian crossing ahead of the own vehicle 29.

Figure 3:
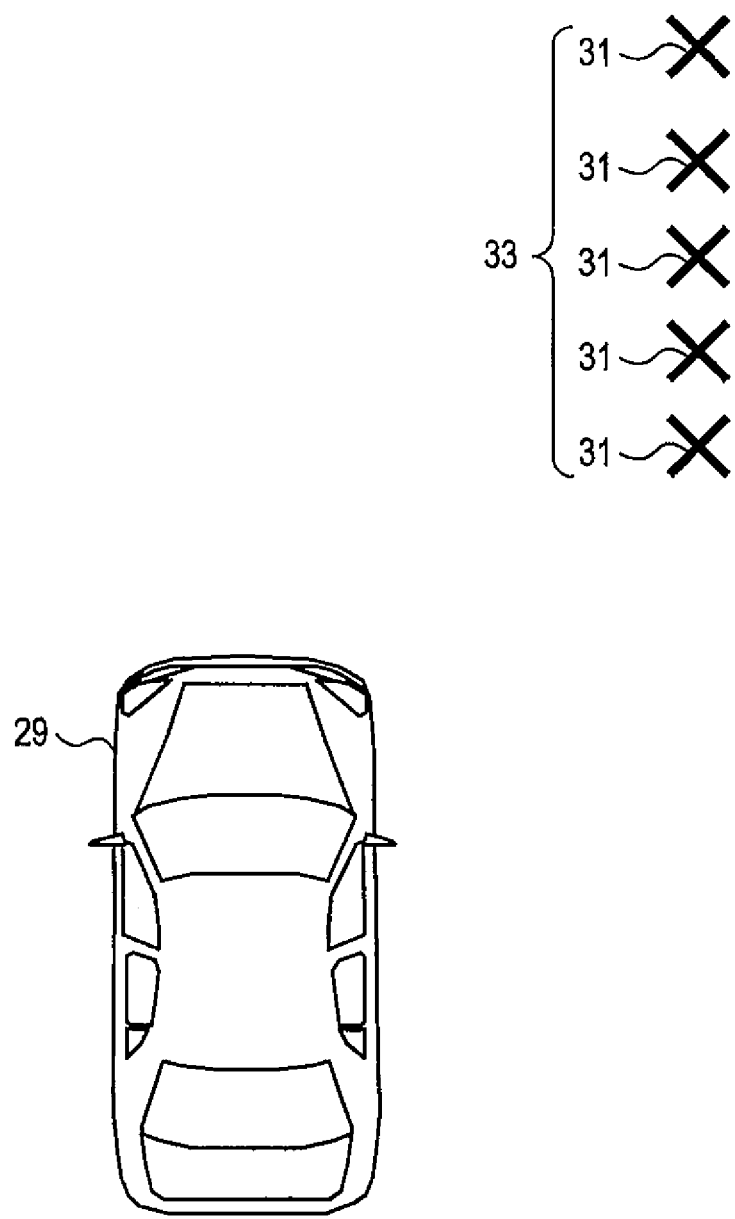
FIG. 3 is a view illustrating an example of an object group associated with the embodiment of the present invention.

If plural objects arranged at constant intervals are detected as an object group in step S1, the pedestrian likelihood calculating unit 5 determines whether the radar-based object is a part of the object group for calculating the array likelihood for the radar-based object. FIG. 3 illustrates an example of the object group. This example represents that there is an object group 31 comprised of plural objects 31 arranged at constant intervals in the travelling direction of the own vehicle 29. The row of poles located at constant intervals along an edge of a road on which the own vehicle 29 is travelling as an example of the object group 33.

If the radar-based object is determined to be a part of the object group, the pedestrian likelihood calculating unit 5 sets the array likelihood for the radar-based object to a value A1. Otherwise, if the radar-based object is determined not to be a part of the object group, the pedestrian likelihood calculating unit 5 sets the array likelihood for the radar-based object to a value A2. Each of the values A1 and A2 is a constant value, and the values A1 and A2 satisfy the following magnitude relationship:

$$0 < A1 < A2$$

As described above, the array likelihood for an object is a parameter representing a probability of the object being a pedestrian crossing ahead of the own vehicle 29. The array likelihood is positive, and the larger the array likelihood is, the higher the probability of the object being a pedestrian crossing ahead of the own vehicle 29, i.e. crossing the travelling direction of the own vehicle 29.

In step S4, the image obtaining unit 9 of the control ECU 1 obtains a frame image ahead of the own vehicle 29 using the image sensor 23.

In step S5, the image recognizing unit 11 of the control ECU 1 recognizes an object, which will be referred to as an image-based object, in the frame image obtained in step S4 using a known image recognition technology.

For example, dictionaries, i.e. dictionary files, DF are previously prepared in the memory 1b for respective objects, such as vehicles, pedestrians, and roadside objects), which should be recognized. Each dictionary DF is expressed as data, i.e. feature pattern data, indicative of many feature patterns of the corresponding object. In particular, a dictionary DF1 for pedestrians, a dictionary DF2 for vehicles, and a dictionary DF3 for roadside objects are stored in the memory 1b.

Specifically, the image recognizing unit 11 performs a matching task between image data of the frame image and each of the dictionaries, i.e. each of the feature patterns of all the dictionaries to correspondingly recognize image-based objects.

In step S6, the matching level obtaining unit 13 and the pedestrian likelihood calculating unit 5 of the control ECU 1 calculates, for the radar-based object detected in step S1, a likelihood for a pedestrian associated with a matching level in accordance with the following procedures; the likelihood associated with the matching level will be referred to as a matching level likelihood.

First, the matching level obtaining unit 13 identifies at least one image-based object in the image-based objects recognized in step S5; the at least one image-based object is identical to the radar-based object detected in step S1; the at least one image-based object identical to the radar-based object detected in step S1 will be referred to as an identical object.

Specifically, the matching level obtaining unit 13 identifies, in the image-based objects, at least one image-based object as an identical object; the distance and azimuth of at least one image-based object relative to the own vehicle 29 are respectively identical or similar to those of the radar-based object relative to the own vehicle 29.

Then, the matching level obtaining unit 13 obtains a matching level between the identical object, i.e. its image data, and the dictionary DF1 for pedestrians based on matching between the identical object and the dictionary DF1. The matching level represents the level of matching between the identical object and a corresponding dictionary. The more features, which are common to the corresponding dictionary, the identical object has, the higher the matching level is. The operation by the matching level obtaining unit 13 can use the recognition result from the image recognizing unit 11.

Next, the pedestrian likelihood calculating unit 5 calculates, based on the matching level of the identical object, a matching likelihood for the radar-based object corresponding to the identical object. Note that the matching likelihood is a parameter representing a probability of a corresponding object being a pedestrian crossing ahead of the own vehicle 29.

The memory 1b stores information defining the relationship between the matching levels and values of the matching likelihood; the information is in the form of, for example, a map, and is stored in the memory 1b as a map M2. Specifically, the pedestrian likelihood calculating unit 5 inputs the matching level of the identical object to the map M2 to thereby calculate a corresponding value of the matching likelihood in the map M2. The calculated value of the matching likelihood is higher when the matching level is higher.

As described above, the matching likelihood is a parameter that represents a probability of an object being a pedestrian crossing ahead of the own vehicle 29. The matching likelihood is positive, and the larger the value of the matching likelihood is, the higher the likelihood for a corresponding object being a pedestrian crossing ahead of the own vehicle 29.

In step S7, the optical flow obtaining unit 15 of the control ECU 1 extracts, among plural frame images including currently obtained frame image in step S4, feature points in the identical object. Then, the optical flow obtaining unit 15 obtains optical flows of the extracted feature points in step S7. The optical flow of a feature point represents an apparent movement of the feature point among the plural frame images.

Figure 4:
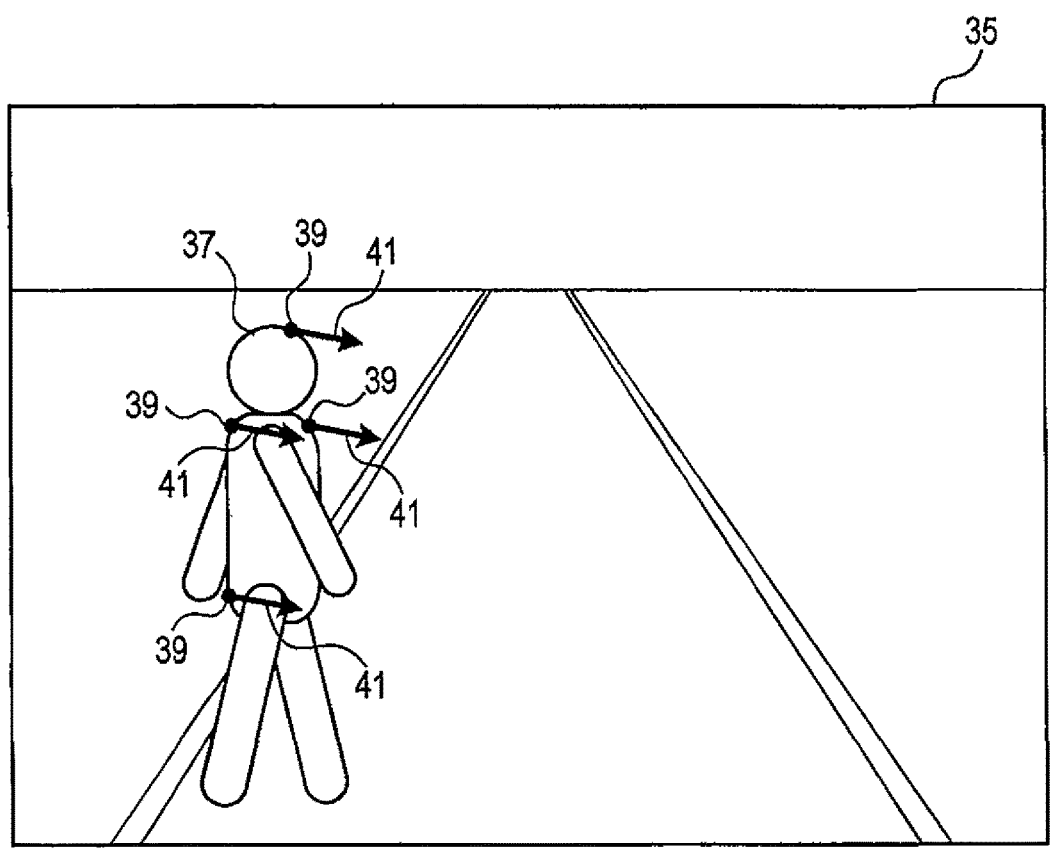
FIG. 4 is an explanatory diagram illustrating an example of optical flows associated with the embodiment of the present invention.

FIG. 4 illustrates an example of optical flows of the identical object obtained by the optical flow obtaining unit 15. In this example, optical flows 41 respectively represent movements of feature points 39 of a pedestrian 37, which is the identical object recognized in a previous frame image 35, to corresponding positions on a current frame image; the optical flows 41 are expressed by arrow marks. These optical flows 41 are obtained by the optical flow obtaining unit 15.

In step S8, the pedestrian likelihood calculating unit 5 calculates, for the radar-based object detected in step S1, a likelihood for a pedestrian associated with the optical flows of the radar-based object in accordance with the following procedures upon the radar-based object detected in step S1 corresponding to the identical object; the likelihood associated with the optical flows will be referred to as an optical flow likelihood. Note that the optical flow likelihood is a parameter representing a probability of an object being a pedestrian crossing ahead of the own vehicle 29.

First, the pedestrian likelihood calculating unit 5 determines whether the optical flows obtained in step S7 each show a lateral movement on the current frame image, i.e. a movement in a width direction of the own vehicle 29, or a movement in a horizontal direction perpendicular to a road on which the own vehicle 29 is travelling. In other words, the pedestrian likelihood calculating unit 5 determines whether the direction of each optical flow shows the horizontal direction.

Note that the lateral movements based on the optical flows include not only perfect horizontal directions but also movements in directions each inclined relative to the perfect horizontal direction within a predetermined acute angle.

In step S8, upon determination that the optical flows obtained in step S7 each show the lateral movement on the current frame image, the pedestrian likelihood calculating unit 5 sets the optical flow likelihood for the radar-based object detected in step S1, which corresponds to the identical object, to a value B1.

Otherwise, upon determination that the optical flows obtained in step S7 each do not show the lateral movement on the current frame image, the pedestrian likelihood calculating unit 5 sets the optical flow likelihood for the radar-based object to a value B2. Each of the values B1 and B2 is a constant value, and the values B1 and B2 satisfy the following magnitude relationship:

$$0<B2<B1$$

As described above, the optical flow likelihood is a parameter representing a probability of an object being a pedestrian crossing ahead of the own vehicle 29. The optical flow likelihood is positive, and the larger the optical flow likelihood is, the higher the probability of the object being a pedestrian crossing the travelling direction of the own vehicle 29.

In step S9, the moving speed obtaining unit 17 of the control ECU 1 obtains a moving speed of the radar-based object in step S1 in the lateral direction, and the movement distance obtaining unit 19 obtains a movement distance of the radar-based object detected in step S1.

Figure 5:
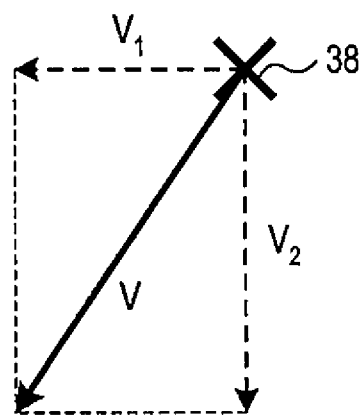
FIG. 5 is a view illustrating a lateral moving speed of a radar-based object associated with the embodiment of the present invention.
Figure 5:
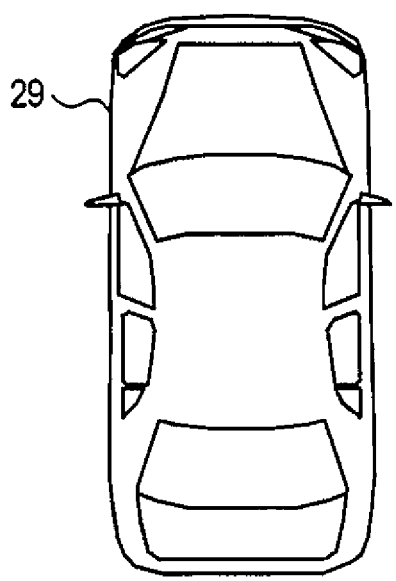

The following describes, in accordance with FIG. 5, the moving speed of the radar-based object, which is illustrated by reference numeral. 38 in FIG. 5, in the lateral direction and the movement distance of the radar-based object 38. Let us assume that the relative speed of the radar-based object 38 detected in step S1 is represented as V. At that time, a moving speed V1 of the radar-based object 38 in the lateral direction is a component of the relative speed V in the width direction of the own vehicle 29. Additionally, a movement distance of the radar-based object 38 in the lateral direction is an integral quantity of the moving speed V1 over a predetermined period.

The moving speed obtaining unit 17 is capable of obtaining, from the detection result from the radar device 21, the moving speed and the movement distance of the radar-based object in the lateral direction. The moving speed obtaining unit 17 is also capable of obtaining, from the plural frame images captured by the image sensor 23, the moving speed and the movement distance of the radar-based object in the lateral direction; the radar-based object corresponds to the identical object.

In step S10, the pedestrian likelihood calculating unit 5 calculates, for the radar-based object detected in step S1, a likelihood for a pedestrian associated with the moving speed of the radar-based object in the lateral direction in accordance with the following procedures; the likelihood for a pedestrian associated with the moving speed of the radar-based object in the lateral direction will be referred to as a moving speed likelihood.

Specifically, the pedestrian likelihood calculating unit 5 determines whether the moving speed of the radar-based object in the lateral direction., which is obtained in step S9, is within a predetermined range. Note that the predetermined range is previously defined as a range including typical speeds of pedestrians crossing ahead of the own vehicle 29.

The pedestrian likelihood calculating unit 5 sets the moving speed likelihood for the radar-based object detected in step S1 to a value C1 upon determination that moving speed of the radar-based object in the lateral direction is within the predetermined range. Otherwise, the pedestrian likelihood calculating unit 5 sets the moving speed likelihood for the radar-based object detected in step S1 to a value C2 upon determination that moving speed of the radar-based object in the lateral direction is outside the predetermined range. Each of the values C1 and C2 is a constant value, and the values C1 and C2 satisfy the following magnitude relationship:

$$0 < C2 < C1$$

Note that moving speed likelihood is a parameter representing a probability of an object being a pedestrian crossing ahead of the own vehicle 29. The moving speed likelihood is positive, and the larger the moving speed likelihood is, the higher the probability of the abject being a pedestrian crossing the travelling direction of the own vehicle 29.

In step S11, the pedestrian likelihood calculating unit 5 calculates, for the radar-based object detected in step S1, a likelihood for a pedestrian associated with the movement distance of the radar-based abject in the lateral direction in accordance with the following procedures; the likelihood for a pedestrian associated with the movement distance of the radar-based object in the lateral direction will be referred to as a movement distance likelihood.

Specifically, the pedestrian likelihood calculating unit 5 determines whether the movement distance of the radar-based object in the lateral direction, which is obtained in step S9, is within a predetermined range. Note that the predetermined range is previously defined as a range including typical movement distances of pedestrians crossing ahead of the own vehicle 29.

The pedestrian likelihood calculating unit 5 sets the movement distance likelihood for the radar-based object detected in step S1 to a value D1 upon determination that movement distance of the radar-based object in the lateral direction is within the predetermined range. Otherwise, the pedestrian likelihood calculating unit 5 sets the movement distance likelihood for the radar-based object detected in step S1 to a value D2 upon determination that movement distance of the radar-based object in the lateral direction is outside the predetermined range. Each of the values D1 and D2 is a constant value, and the values D1 and D2 satisfy the following magnitude relationship:

$$0 < D2 < D1$$

Note that movement distance likelihood is a parameter representing a probability of an object being a pedestrian crossing ahead of the own vehicle 29. The movement distance likelihood is positive, and the larger the movement distance likelihood is, the higher the probability of the object being a pedestrian crossing the travelling direction of the own vehicle 29.

In step S12, the pedestrian likelihood calculating unit 5 calculates, for the radar-based object detected in step S1, the multiplication among
1. The reflected-wave likelihood calculated in step S2
2. The array likelihood calculated in step S3
3. The matching level likelihood calculated in step S6
4. The optical flow likelihood calculated in step S8
5. The moving speed likelihood calculated in step S10
6. The movement distance likelihood calculated in step S11

Then, the pedestrian likelihood calculating unit 5 obtains the result of the multiplication as an overall likelihood for the radar-based object being a pedestrian in step S12.

Note that the matching level likelihood and the optical flow likelihood are used upon the radar-based object detected in step S1 being a radar-based object corresponding to the identical object. That is, multiplication among the reflected-wave likelihood, array likelihood, moving speed likelihood, and movement distance likelihood except for the matching level likelihood and the optical flow likelihood enables the overall likelihood to be calculated upon the radar-based object detected in step S1 being not the identical object.

A value of the overall likelihood for the radar-based object is set to be larger if the intensities of the reflected waves generated by an object detected by the millimeter wave radar 25 as a radar-based object do not exceed the predetermined first threshold than if the intensities of the reflected waves exceed the predetermined first threshold. Similarly, a value of the overall likelihood for the radar-based object is set to be larger if the magnitude of the fluctuations of the reflected waves does not exceed the predetermined second threshold than if the magnitude of the fluctuations of the reflected waves exceeds the predetermined second threshold.

A value of the overall likelihood for the radar-based object is set to he larger if the radar-based object is determined to be a part of the object group than if the radar-based object is determined to be not a part of the object group. The higher the matching level of the identical object corresponding to the radar-based object is, the higher a value of the overall likelihood for the radar-based object is. A value of the overall likelihood for the radar-based object is set to be larger if the optical flows of feature points of the identical object show lateral movements on the frame image than if the optical flows of the feature points of the identical object do not show lateral movements on the frame image.

A value of the overall likelihood for the radar-based object is set to be larger if the moving speed of the radar-based object is within the predetermined range than if the moving speed of the radar-based object is outside the predetermined range.

A value of the overall likelihood for the radar-based object is set to be larger if the movement distance of the radar-based object is within the predetermined range than if the movement distance of the radar-based object is outside the predetermined range.

In step S13, the pedestrian determining unit 7 determines whether a value of the overall likelihood for the radar-based object calculated in step S12 is equal to or higher than a predetermined third threshold.

Upon determination that a value of the overall likelihood for the radar-based object calculated in step S12 is equal to or higher than the predetermined third threshold (YES in step S13), the pedestrian determining task proceeds to step S14. Otherwise, upon determination that a value of the overall likelihood for the radar-based object calculated in step S12 is lower than the predetermined third threshold (NO in step S13), the pedestrian determining task proceeds to step S17.

In step S14, the pedestrian determining unit 7 of the control ECU 1 determines that the radar-based object is a crossing pedestrian object or a crossing target representing a pedestrian crossing ahead of the own vehicle.

In step S15, the brake condition setting unit 21 of the control ECU 1 establishes first brake execution conditions. The first brake execution conditions are configured such that, if the crossing pedestrian object determined in step S14 satisfies the first brake execution conditions, the control ECU 1 outputs, to the brake ECU 27, the execution instruction of automatic braking. The first brake execution conditions for example include 1. A condition associated with a time to collision (TTC) to the determined crossing pedestrian object
2. A condition associated with the distance to the determined crossing pedestrian object
3. A condition associated with the azimuth of the determined crossing pedestrian object.

The first brake execution conditions are suitable for the crossing pedestrian object crossing ahead of the own vehicle 29. For example, the first brake execution conditions are more unlikely to be satisfied than second brake execution conditions described later.

Note that the first brake execution conditions can be previously determined to be stored in the memory 1b.

In step S16, the brake determining unit 22 of the control ECU 1 calculates the time to collision (TTC) in accordance with the relative distance of the crossing pedestrian object from the own vehicle 29, the azimuth of the crossing pedestrian object relative to the own vehicle 29, and the relative acceleration of the crossing pedestrian object relative to the own vehicle 29; the TTC is a margin time until which the own vehicle 29 would collide with the crossing pedestrian object. Then, the brake determining unit 22 determines whether the relative distance of the crossing pedestrian object from the own vehicle 29, the azimuth of the crossing pedestrian object relative to the own vehicle 29, and the TTC between the crossing pedestrian object and the own vehicle 29 satisfy the respective first brake execution conditions.

The brake determining unit 22 of the control ECU 1 outputs, to the brake ECU 27, the execution instruction of automatic braking upon determination that the relative distance of the crossing pedestrian object from the own vehicle 29, the azimuth of the crossing pedestrian object relative to the own vehicle 29, and the TTC between the crossing pedestrian object and the own vehicle 29 satisfy the respective first brake execution conditions.

Otherwise, the control ECU 1 terminates the pedestrian determining task upon determination that the relative distance of the crossing pedestrian object from the own vehicle 29, the azimuth of the crossing pedestrian object relative to the own vehicle 29, and the UC between the crossing pedestrian object and the own vehicle 29 do not satisfy the respective first brake execution conditions.

Otherwise, upon determination that a value of the overall likelihood for the radar-based object calculated in step S12 is lower than the predetermined third threshold (NO in step S13), the pedestrian determining unit 7 of the control ECU 1 determines that the radar-based object is a non crossing-pedestrian object representing an object other than pedestrians crossing ahead of the own vehicle.

In step S18, the brake condition setting unit 21 establishes second brake execution conditions. The second brake execution conditions are configured such that, if the non crossing-pedestrian object determined in step S 17 satisfies the second brake execution conditions, the control ECU 1 outputs, to the brake ECU 27, the execution instruction of automatic braking. The second brake execution conditions for example include 1. A condition associated with a TTC to the determined non crossing-pedestrian object
2. A condition associated with the distance to the determined non crossing-pedestrian object
3. A condition associated with the azimuth of the determined non crossing-pedestrian object.

The second brake execution conditions are suitable for the non crossing-pedestrian object crossing ahead of the own vehicle 29.

In step S16, the brake determining unit 22 of the control ECU 1 calculates the time to collision (TTC) in accordance with the relative distance of the non crossing-pedestrian object from the own vehicle 29, the azimuth of the non crossing-pedestrian object relative to the own vehicle 29, and the relative acceleration of the non crossing-pedestrian object relative to the own vehicle 29; the TTC is a margin time until which the own vehicle 29 would collide with the non crossing-pedestrian object. Then, the brake determining unit 22 determines whether the relative distance of the non crossing-pedestrian object from the own vehicle 29, the azimuth of the non crossing-pedestrian object relative to the own vehicle 29, and the TTC between the non crossing-pedestrian object and the own vehicle 29 satisfy the respective second brake execution conditions.

The brake determining unit 22 of the control ECU 1 outputs, to the brake ECU 27, the execution instruction of automatic braking upon determination that the relative distance of the non crossing-pedestrian object from the own vehicle 29, the azimuth of the non crossing-pedestrian object relative to the own vehicle 29, and the TTC between the non crossing-pedestrian object and the own vehicle 29 satisfy the respective second brake execution conditions.

Otherwise, the control ECU 1 terminates the pedestrian determining task upon determination that the relative distance of the non crossing-pedestrian object from the own vehicle 29, the azimuth of the non crossing-pedestrian object relative to the own vehicle 29, and the TTC between the non crossing-pedestrian object and the own vehicle 29 do not satisfy the respective second brake execution conditions.

Note that the second brake execution conditions can be previously determined to be stored in the memory 1b.

Note that, if detecting plural objects in step S1, the control ECU 1 performs the operation in step S2 and the subsequent operations.

3. Advantageous Effect Achieved by Control ECU 1

The control. ECU 1 is configured to

1. Determine whether a radar-based object detected by the millimeter wave radar 25 is a part of a group of objects arranged at constant intervals
2. Set the array likelihood for the radar-based object to be lower if the radar-based object is determined to be a part of the group of the objects arranged at the constant intervals than if the radar-based object is not determined to be a part of the group of the objects arranged at the constant intervals This configuration reduces the probability of an object in an object group, such as a pole group, which are arranged on a travelling road of the own vehicle 29 at regular intervals along the travelling direction of the own vehicle 29, being determined as a pedestrian crossing ahead of the own vehicle 29.

The control ECU 1 is configured to, upon a radar-based object detected by the millimeter wave radar 25 being determined to be identical to an image-based object detected by the image sensor 23, set the matching level likelihood for the radar-based object such that, the higher the matching level between the image data of the image-based object, i.e. the identical object, and the pedestrian dictionary DF1 is, the higher the matching level of the radar-based object corresponding to the identical object is.

This configuration enables whether the radar-based object is a pedestrian crossing ahead of the own vehicle 29 to be determined with higher accuracy.

The control ECU 1 is configured to set the optical flow likelihood for the radar-based object detected by the millimeter wave radar 25 to be higher if optical flows of feature points on the identical object show lateral movements on a frame image than if the optical flows do not show lateral movements on the frame image. If the optical flows of the feature points on the identical object show lateral movements on the frame image, the radar-based object corresponding to the identical object is likely to correspond to a pedestrian crossing ahead of the own vehicle 29. Calculating, by the control. ECU 1, the optical flow likelihood for the radar-based object therefore enables whether the radar-based object is a pedestrian crossing ahead of the own vehicle 29 to be determined with higher accuracy.

The control ECU 1 is configured to set the reflected-wave likelihood for a radar-based object detected by the millimeter wave radar 25 to be higher if the intensities of the reflected waves generated by the radar-based object based on the transmitted radar wave do not exceed a predetermined threshold than if the intensities of the reflected waves exceed the predetermined threshold. Similarly, the control ECU 1 is configured to set the reflected-wave likelihood for the radar-based object detected by the millimeter wave radar 25 to be higher if the magnitude of the fluctuations of the reflected waves generated by the radar-based object based on the transmitted radar wave exceeds a predetermined threshold than if the magnitude of the fluctuations of the reflected waves generated by the radar-based object based on the transmitted radar wave do not exceed the predetermined threshold.

The smaller the intensities of e reflected waves based on a radar-based object are or the larger the magnitude of the fluctuations of the reflected waves are, the higher the probability of the radar-based object being a pedestrian crossing ahead of the own vehicle 29 is. Calculating, by the control ECU 1, the reflected-wave likelihood for the radar-based object therefore enables whether the radar-based object is a pedestrian crossing ahead of the own vehicle 29 to be determined with higher accuracy.

The control ECU 1 is configured to set the moving speed likelihood for the radar-based object to be higher if the lateral moving speed of the radar-based object is within a predetermined range than if the lateral moving speed of the radar-based object is outside the predetermined range.

If the lateral moving speed of the radar-based object is within the predetermined range, the radar-based object is likely to be a pedestrian crossing ahead of the own vehicle 29. Calculating, by the control ECU 1, the moving speed likelihood for the radar-based object therefore enables whether the radar-based object is a pedestrian crossing ahead of the own vehicle 29 to be determined with higher accuracy.

If the lateral movement distance of the radar-based object is within a predetermined range, the radar-based object is likely to be a pedestrian crossing ahead of the own vehicle 29. Calculating, by the control ECU 1, the movement distance likelihood for the radar-based object set forth above enables whether the radar-based object is a pedestrian crossing ahead of the own vehicle 29 to be determined with higher accuracy.

(Modifications)

The embodiment of the present invention has been described in detail. The present invention is however not limited to the above described embodiment, and can be variably modified.

The control ECU 1 can select, for each radar-based objects detected by the millimeter wave radar 25, one of the reflected-wave likelihood, the array likelihood, the matching level likelihood, the optical flow likelihood, the moving speed likelihood, and the movement distance likelihood.

Then, the control ECU 1 can determine the selected likelihood as the overall likelihood.

The control ECU 1 can select, for each radar-based objects detected by the millimeter wave radar 25, some of these likelihoods, and multiply the selected likelihoods to each other, thus calculating the overall likelihood for the radar-based object.

Specifically, the control ECU 1 can select at least one of
1. The operation in step S3, which is referred to as a first operation
2. The operation in step S6, which is referred to as a second operation
3. The operation in step S7, which is referred to as a third operation
4. The operation in step S2, which is referred to as a fourth operation
5. The operation in step S10, which is referred to as a fifth operation
6. The operation in step S11, which is referred to as a sixth operation Then, the control ECU 1 can execute the selected at least one operation to thereby calculate a corresponding at least one of the array likelihood, matching level likelihood, optical flow likelihood, reflected-wave likelihood, moving speed likelihood, and movement distance likelihood. Note that the control ECU 1 can select at least one of the operation in step S3 (first operation), the operation in step S6 (second operation), the operation in step S7 (third operation), the operation in step S2 (fourth operation), the operation in step S10 (fifth operation), and the operation in step S11 (sixth operation) as an operation suitable for, for example, the travelling state of the own vehicle 29. Then, the control ECU 1 can set at least one likelihood corresponding to the selected at least one operation as the overall likelihood.

For example, the control ECU 1 can determine the array likelihood for each radar-based object detected by the millimeter wave radar 25 as the overall likelihood for the radar-based object. The control ECU 1 also can multiply, for each radar-based object detected by the millimeter wave radar 25, the array likelihood and the matching level likelihood to each other to correspondingly determine the multiplication result as the overall likelihood.

Additionally, the control ECU 1 can multiply, for each radar-based object detected by the millimeter wave radar 25, the array likelihood and the optical flow likelihood by each other to correspondingly determine the multiplication result as the overall likelihood. The control ECU 1 can multiply, for each radar-based object detected by the millimeter wave radar 25, the array likelihood, matching level likelihood, and optical flow likelihood together to correspondingly determine the multiplication result as the overall likelihood.

Assuming that the above six likelihoods, i.e. the reflected-wave likelihood, the array likelihood, the matching level likelihood, the optical flow likelihood, the moving speed likelihood, and the movement distance likelihood for determining whether the radar-based object is a crossing pedestrian, are referred to as six crossing-pedestrian likelihoods, the control ECU 1 can multiply at least one of the crossing-pedestrian likelihoods by another known crossing-pedestrian likelihood to correspondingly calculate the overall likelihood for the radar-based object.

The control ECU 1 can calculate the overall likelihood for the radar-based object using another calculation based on the six likelihoods instead of the multiplication set forth above to correspondingly calculate the overall likelihood for the radar-based object.

For example, the control ECU 1 can add some of or all of the six crossing-pedestrian likelihoods for the radar-based object to each other to thereby calculate the overall likelihood for the radar-based object. The control ECU 1 also can assign at least one of the six crossing-pedestrian likelihoods for the radar-based object to a suitably established equation to thereby calculate the overall likelihood for the radar-based object.

The control ECU 1 can detect objects using a sensor other than millimeter wave radar 25. For example, the control ECU 1 can use, in place of the millimeter wave radar 25, a radar device that uses electromagnetic waves as the transmission waves whose wavebands are set to be different from a millimeter waveband or a lidar that uses electromagnetic waves having very short wavelengths.

The control ECU 1 is capable of determining whether the radar-based object detected by the millimeter wave radar 25 is a part of objects arranged at regular intervals using a frame image captured by the image sensor 23.

The control ECU 1 can calculate, for each radar-based object detected by the millimeter wave radar 25, the reflected-wave likelihood in accordance with only the magnitudes of the fluctuations of the reflected waves independently of the intensities of the reflected waves. The control ECU 1 can also calculate, for each radar-based object detected by the millimeter wave radar 25, the reflected-wave likelihood in accordance with only the intensities of the reflected waves independently of the magnitudes of the fluctuations of the reflected waves.

The functions of one element in the embodiment can be distributed as plural elements, and the functions that plural elements have can be combined into one element. At least part of the structure of the embodiment can be replaced with a known structure having the same function as the at least part of the structure of the embodiment. A part of the structure of the embodiment can be eliminated. At least part of the structure of the embodiment can be added to or replaced with the structure of each of the modifications. All aspects included in the technological ideas specified by the language employed by the claims constitute embodiments of the present invention.

The present invention can be implemented by various embodiments in addition to the control ECU 1; the various embodiments include systems each including the control ECU 1, programs for serving a computer as the control ECU 1, non-transitory storage media storing the programs, and pedestrian determining methods.

REFERENCE SIGNS LIST

1 . . . Control ECU, 3 . . . Object detecting unit, 5 . . . Pedestrian likelihood calculating unit, 7 . . . Pedestrian determining unit, 9 . . . Image obtaining unit, 11 . . . Image recognizing unit, 13 . . . Matching level obtaining unit, 15 . . . Optical flow obtaining unit, 17 . . . Moving speed obtaining unit, 19 . . . Movement distance obtaining unit, 21 . . . Brake condition setting unit, 22 . . . Brake determining unit, 23 . . . Image sensor, 25 . . . Millimeter wave radar, 27 . . . Brake ECU, 29 . . . Own vehicle, 31 . . . Object, 33 . . . Object group, 35 . . . Image, 37 . . . Identical object, 38 . . . Object, 39 . . . Feature point, 41 . . . Optical flow

The invention claimed is:

1. A pedestrian determining apparatus for determining whether an object is a pedestrian crossing ahead of an own vehicle, the pedestrian determining apparatus comprising:
   an object detecting unit that detects, based on waves reflected by an object, the object as a radar-based object, the reflected waves being generated based on reflection, by the object, of radar waves transmitted ahead of the own vehicle;
   a likelihood calculating unit that calculates, for the radar-based object detected by the object detecting unit, a likelihood of the radar-based object being a pedestrian crossing ahead of the own vehicle; and
   a pedestrian determining unit that:
      determines whether the calculated likelihood is equal to or higher than a predetermined threshold; and
      determines that the radar-based object is a pedestrian crossing ahead of the own vehicle upon determination that the calculated likelihood is equal to or higher than the predetermined threshold,
   the likelihood calculating unit being configured to set the likelihood for the radar-based object to be lower for a state in which the radar-based object is detected as a part of a group of objects arranged at regular intervals than for a state in which the radar-based object is not detected as a part of the group of objects arranged at regular intervals.

2. The pedestrian determining apparatus according to claim 1, further comprising:
   an image obtaining unit that obtains a captured image of scenery ahead of the own vehicle;
   an image recognizing unit that recognizes an object in the obtained image as an image-based object; and
   a matching level obtaining unit comprising a dictionary of pedestrians and configured to:
      obtain, upon the image-based object recognized by the image recognizing unit being identical to the radar-based object detected by the object detecting unit, a matching level between the image-based object and the dictionary of pedestrians in accordance with a matching task between the image-based object and the dictionary of pedestrians,
   the likelihood calculating unit being configured to set the likelihood for the radar-based object such that, the higher the matching level is, the higher the likelihood for the radar-based object.

3. The pedestrian determining apparatus according to claim 1, further comprising:
   an image obtaining unit that obtains a captured image of scenery ahead of the own vehicle;
   an image recognizing unit that recognizes an object in the obtained image as an image-based object; and
   an optical flow obtaining unit configured to, upon the image-based object recognized by the image recognizing unit being identical to the radar-based object detected by the object detecting unit, obtain optical flows of feature points on the image-based object, the likelihood calculating unit being configured to set the likelihood for the radar-based object to be higher for a state in which the optical flows show lateral movements on the image than for a state in which the optical flows do not show the lateral movements on the image.

4. The pedestrian determining apparatus according to claim 1, wherein:
the likelihood calculating unit is configured to:
determine whether intensities of the reflected waves are equal to or less than a predetermined threshold level; and
set the likelihood for the radar-based object to be higher for a state in which the intensities of the reflected waves are equal to or less than the predetermined threshold level than for a state in which the intensities of the reflected waves are more than the predetermined threshold level.

5. The pedestrian determining apparatus according to claim 1, wherein:
the likelihood calculating unit is configured to:
determine whether magnitudes of fluctuations of the reflected waves are equal to or more than a predetermined threshold value; and
set the likelihood for the radar-based object to be higher for a state in which the magnitudes of the fluctuations of the reflected waves are equal to or more than the predetermined threshold value than for a state in which the magnitudes of the fluctuations of the reflected waves are less than the predetermined threshold value.

6. The pedestrian determining apparatus according to claim 1, further comprising:
a moving speed obtaining unit that obtains a lateral moving speed of the radar-based object,
the likelihood calculating unit being configured to:
determine whether the lateral moving speed of the radar-based object is within a predetermined range; and
set the likelihood for the radar-based object to be higher for a state in which the lateral moving speed of the radar-based object is within the predetermined range than for a state in which the lateral moving speed of the radar-based object is outside the predetermined range.

7. The pedestrian determining apparatus according to claim 1, further comprising:
a movement distance obtaining unit that obtains a lateral movement distance of the radar-based object,
the likelihood calculating unit being configured to:
determine whether the lateral movement distance of the radar-based object is within a predetermined distance range; and
set the likelihood for the radar-based object to be higher for a state in which the lateral movement distance of the radar-based object is within the predetermined distance range than for a state in which the lateral movement distance of the radar-based object is outside the predetermined distance range.

8. The pedestrian determining apparatus according to claim 1, wherein:
the likelihood calculating unit is configured to:
determine whether the radar-based object is detected as a part of a group of objects arranged at regular intervals; and
set the likelihood for the radar-based object to be lower in response to determining that the radar-based object being detected as a part of the group of objects arranged at regular intervals rather than determining that the radar-based object being not detected as a part of the group of objects arranged at regular intervals.

9. The pedestrian determining apparatus according to claim 7, wherein
the predetermined distance range is previously defined as a range including movement distances of pedestrians crossing ahead of the own vehicle.

10. The pedestrian determining apparatus according to claim 6, wherein
the predetermined range is previously defined as a range including speeds of pedestrians crossing ahead of the own vehicle.

11. A pedestrian determining apparatus for determining whether an object is a pedestrian crossing ahead of an own vehicle, the pedestrian determining apparatus comprising:
an object detecting unit that detects, based on waves reflected by an object, the object as a radar-based object, the reflected waves being generated based on reflection, by the object, of radar waves transmitted ahead of the own vehicle;
an image obtaining unit that obtains a captured image of scenery ahead of the own vehicle;
an image recognizing unit that recognizes an object in the obtained image as an image-based object;
a matching level obtaining unit comprising a dictionary of pedestrians and configured to obtain, upon the image-based object recognized by the image recognizing unit being identical to the radar-based object detected by the object detecting unit, a matching level between the image-based object and the dictionary of pedestrians in accordance with a matching task between the image-based object and the dictionary of pedestrians;
an optical flow obtaining unit configured to, upon the image-based object recognized by the image recognizing unit being identical to the radar-based object detected by the object detecting unit, obtain optical flows of feature points on the image-based object;
a moving speed obtaining unit that obtains a lateral moving speed of the radar-based object;
a movement distance obtaining unit that obtains a lateral movement distance of the radar-based object; and
a likelihood calculating unit that executes at least one of:
a first task to set a first likelihood for the radar-based object to be lower for a state in which the radar-based object is detected as a part of a group of objects arranged at regular intervals than for a state in which the radar-based object is not detected as a part of the group of objects arranged at regular intervals, the first likelihood being a likelihood of the radar-based object being a pedestrian crossing ahead of the own vehicle;
a second task to set a second likelihood for the radar-based object such that, the higher the matching level is, the higher the second likelihood for the radar-based object is, the second likelihood being a likelihood of the radar-based object being a pedestrian crossing ahead of the own vehicle;
a third task to set a third likelihood for the radar-based object to be higher for a state in which the optical flows show lateral movements on the image than for a state in which the optical flows do not show the lateral movements on the image, the third likelihood being a likelihood of the radar-based object being a pedestrian crossing ahead of the own vehicle;

a fourth task to:
  set a fourth likelihood for the radar-based object to be higher for a state in which intensities of the reflected waves are equal to or less than a predetermined threshold level than for a state in which the intensities of the reflected waves are more than the predetermined threshold level; and
  set the fourth likelihood for the radar-based object to be higher for a state in which magnitudes of fluctuations of the reflected waves are equal to or more than a predetermined threshold value than for a state in which the magnitudes of the fluctuations of the reflected waves are less than the predetermined threshold value, the fourth likelihood being a likelihood of the radar-based object being a pedestrian crossing ahead of the own vehicle;

a fifth task to set a fifth likelihood for the radar-based object to be higher for a state in which the lateral moving speed of the radar-based object is within a predetermined range than for a state in which the lateral moving speed of the radar-based object is outside the predetermined range, the fifth likelihood being a likelihood of the radar-based object being a pedestrian crossing ahead of the own vehicle; and a sixth task to set a sixth likelihood for the radar-based object to be higher for a state in which the lateral movement distance of the radar-based object is within a predetermined distance range than for a state in which the lateral movement distance of the radar-based object is outside the predetermined distance range, the sixth likelihood being a likelihood of the radar-based object being a pedestrian crossing ahead of the own vehicle; and a pedestrian determining unit that determines whether the radar-based object is a pedestrian crossing ahead of the own vehicle in accordance with at least one of the first to sixth likelihoods obtained by a corresponding at least one of the first to sixth tasks.

12. The pedestrian determining apparatus according to claim 11, wherein:
  the likelihood calculating unit is configured to:
    execute at least two of the first to sixth tasks to obtain at least two likelihoods in the first to sixth likelihoods; and
    execute a predetermined calculation based on the at least two of the first to sixth likelihoods to correspondingly calculate an overall likelihood for the radar-based object; and
  the pedestrian determining unit is configured to:
    determine whether the calculated overall likelihood is equal to or more than a predetermined threshold; and
    determine that the radar-based object is a pedestrian crossing ahead of the own vehicle upon determination that the calculated overall likelihood is equal to or more than the predetermined threshold.

13. The pedestrian determining apparatus according to claim 11, wherein:
  the likelihood calculating unit is configured to:
    determine whether the radar-based object is detected as a part of a group of objects arranged at regular intervals; and
    wherein execution of the first task sets the first likelihood for the radar-based object to be lower in response to determining that the radar-based object being detected as a part of the group of objects arranged at regular intervals rather than determining that the radar-based object being not detected as a part of the group of objects arranged at regular intervals.

* * * * *